(12) United States Patent
Kim et al.

(10) Patent No.: US 7,218,598 B2
(45) Date of Patent: May 15, 2007

(54) OPTICAL PICKUP USING TWO-WAVELENGTH LIGHT SOURCE MODULE

(75) Inventors: Kun-soo Kim, Seoul (KR);
Pyong-yong Seong, Seoul (KR);
Sun-mook Park, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 537 days.

(21) Appl. No.: 10/655,608

(22) Filed: Sep. 5, 2003

(65) Prior Publication Data
US 2004/0120242 A1 Jun. 24, 2004

(30) Foreign Application Priority Data
Sep. 6, 2002 (KR) .................. 10-2002-0053814

(51) Int. Cl.
*G11B 7/00* (2006.01)
(52) U.S. Cl. .................. 369/112.01; 369/44.23
(58) Field of Classification Search .......... 369/112.01, 369/112.1, 112.05, 112.07, 112.09, 120, 121, 369/122, 44.23, 44.24, 44.21
See application file for complete search history.

(56) References Cited
U.S. PATENT DOCUMENTS 6,084,843 A * 7/2000 Abe et al. .............. 369/112.07
6,181,668 B1 1/2001 Kajiyama et al.
6,671,247 B1 * 12/2003 Arai et al. .............. 369/112.01
6,680,894 B2 1/2004 Hayashi et al.
6,760,296 B1 * 7/2004 Baba et al. ............. 369/112.05

FOREIGN PATENT DOCUMENTS

| CN | WO98/13826 | 2/1998 |
| CN | 2000-313673 | 10/2000 |
| KR | 1020020008795 A | 1/2002 |

OTHER PUBLICATIONS

Chinese Patent Office Action for corresponding Chinese Patent Application No. 031566596 dated Feb. 24, 2006.

* cited by examiner

*Primary Examiner*—Nabil Hindi
(74) *Attorney, Agent, or Firm*—Staas & Halsey LLP

(57) ABSTRACT

An optical pickup using a two-wavelength light source module includes a light source module, a collimating lens, and a first optical element. The light source module includes first and second light sources which emit first and second light beams of different wavelengths and are formed in a single package. The collimating lens directs the first and/or second light beams into convergent light or divergent light so that the convergent light or the divergent light is incident on the objective lens. The optical pickup is a finite optical system due to the collimating lens. The first optical element is disposed on the traveling paths of the first and second light beams, operates as a lens only for one of the first and second light beams, and corrects a position difference between the first and second light sources along a traveling direction of light. The optical pickup further includes a second optical element which is disposed on the traveling paths of the first and second light beams and matches traveling optical axes of the first and second light beams with each other.

34 Claims, 8 Drawing Sheets

OPTICAL PICKUP USING TWO-WAVELENGTH LIGHT SOURCE MODULE

CROSS-REFERENCE TO RELATED APPLICATIONS

This application claims the benefit of Korean Patent Application No. 2002-53814, filed on Sep. 6, 2002, in the Korean Intellectual Property Office, the disclosure of which is incorporated herein by reference.

BACKGROUND OF THE INVENTION

1. Field of the Invention

The present invention relates to an optical pickup, and more particularly, to an optical pickup using a two-wavelength light source module in which two light sources which emit light of different wavelengths are formed in a single package.

2. Description of the Related Art

Generally, optical pickups that may be compatibly used in both digital versatile discs (DVDs) and compact discs (CDs) are configured such that a light source for the DVDs and a light source for the CDs are used individually. In this case, since an optical lens of the optical pickup must be configured depending on a feature of each of the DVDs and the CDs and two light sources for the DVDs and for the CDs must be assembled individually, an optical structure of the optical pickup is complicated. Also, an installation space of the optical pickup is limited.

Recently, a light source module (for example, TWIN-LD) has been developed in which two light sources (for example, two semiconductor laser chips) for DVDs and for CDs for emitting light of different wavelengths are formed in a single package. However, since a position difference between the two light sources of the light source module is significant, the light source module may be used in some reproduction optical pickups, but may not be used in recording optical pickups.

SUMMARY OF THE INVENTION

The present invention provides an optical pickup with a structure for a finite optical system which includes a two-wavelength light source module having an optical structure which may solve problems caused by a position difference between two light sources of the light source module and may be used in recording optical pickups as well as reproduction optical pickups.

According to an aspect of an embodiment of the present invention, an optical pickup includes a light source module in which first and second light sources which respectively emit first and second light beams of different wavelengths are formed in a single package; an objective lens which focuses the first and second light beams and forms a light spot on a recording surface of a recording medium; a collimating lens which directs the first and/or second light beams into convergent light or divergent light incident on the objective lens, the optical pickup being a finite optical system due to the collimating lens; an optical path converting unit which converts traveling paths of the first and second light beams; a photodetector which receives the first and second light beams reflected from the recording medium and then passed through the objective lens and the optical path converting unit, and detects and information signal and/or an error signal; and a first optical element which is disposed on the traveling paths of the first and second light beams, operates as a lens only for one of the first and second light beams, and corrects a position difference between the first and second light sources along a traveling direction of light.

The collimating lens may direct the first and/or second light beams incident from the light source module into slightly divergent light or slightly convergent light.

Further, the collimating lens may have a short focal length of 15 mm or less.

The optical pickup may further comprise a second optical element which is disposed on the traveling paths of the first and second light beams and matches traveling optical exes of the first and second light beams with each other.

Alternatively, the first optical element may match the traveling optical axes of the first and second light beams with each other as in the second optical element.

The first optical element may be disposed between the optical path converting unit and the objective lens, and may be a transmittable polarization hologram type.

The objective lens may have a transverse magnification from $-\frac{1}{5}$ to $-\frac{1}{20}$.

One of the first and second light beams may have a red wavelength range, the other light beam may have a near infrared ray wavelength range, and the optical pickup may be used to record and/or reproduce information on and/or from a portion of DVD family of optical discs and a portion of CD family of optical discs.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
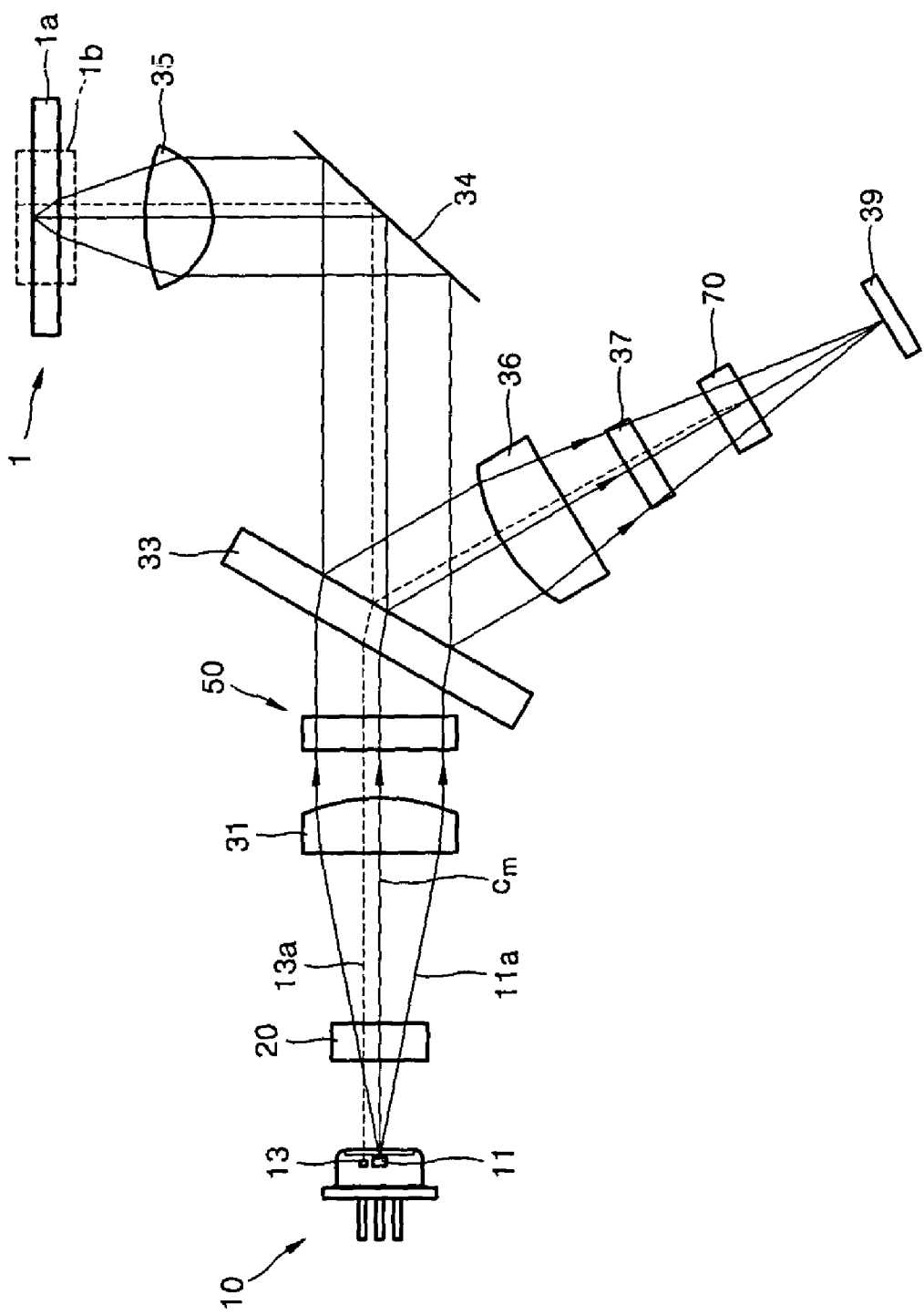
FIG. 1 is schematically shows an optical structure of an optical pickup using a two-wavelength light source module according to a first embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Referring to FIG. 1, an optical pickup according to a first embodiment of the present invention includes a light source module 10, an objective lens 35, a collimating lens 31, an optical path converting unit 33, a photodetector 39, and a first optical element 50. The light source module 10 is configured such that first and second light sources 11 and 13 emitting first and second light beams 11a and 13a of different wavelengths are formed in a single package. The objective lens 35 focuses the first and second light beams 11a and 13a and forms a light spot on a recording surface of an optical disc 1. The collimating lens 31 directs the first and/or second light beams 11a and/or 13a into convergent light or divergent light so that the first and/or second light beams 11a and/or 13a in a convergent light form or a divergent light form are incident on the objective lens 35 to be finite optical system. The optical path converting unit 33 changes traveling paths of the first and second light beams 11a and 13a. The photodetector 39 receives the first and second light beams 11a and 13a which are reflected from the optical disc 1 and pass through the objective lens 35 and the optical path converting unit 33, and detects an information signal and/or an error signal. The first optical element 50 operates as a lens only for one of the first and second light beams 11a and 13a to correct a position difference between the first and second light sources 11 and 13 along a traveling direction of light.

The optical pickup according to the first embodiment of the present invention may further include a second optical element 70. The second optical element 70 corrects relative deviation of the optical axes between the first and second light beams 11a and 13a according to a position difference (dx, dy) between the first and second light sources 11 and 13 in an x-y coordinates plane. Here, assuming that the traveling direction of light is an x-axis direction, the second optical element 70 matches traveling optical axes of the first and second light beams 11a and 13a with each other.

The light source module 10 may be a TWIN-LD in which two semiconductor laser chips are formed in a single package. To use the optical pickup according to an embodiment of the present invention in recording and/or reproducing information on and/or from some DVD family optical discs 1a (to be referred hereinafter to as a DVD) and some CD family optical discs 1b (to be referred hereinafter to as a CD), a semiconductor laser chip for a DVD emitting the first light beam 11a having a red wavelength range, for example, a wavelength of 650 nm may be used as the first light source 11. Further, a semiconductor laser chip for a CD emitting the second light beam 13a having a near infrared ray wavelength range, for example, a wavelength of 780 nm may be used as the second light source 13.

Figure 2:
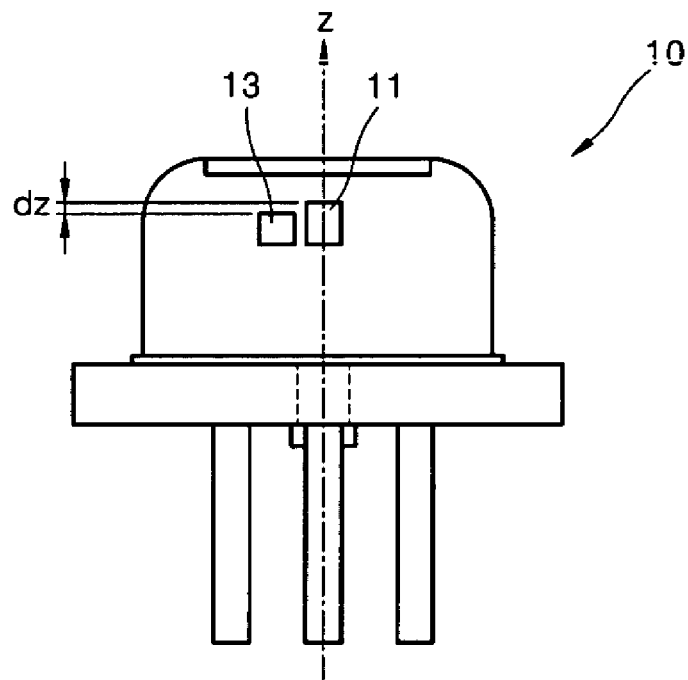
FIG. 2 shows a position difference between first and second light sources of the light source module of FIG. 1 along an axis in a traveling direction of light, that is, a z-axis.

When the traveling optical axis of light is the z-axis, a position difference dz between the first and second light sources 11 and 13 along z-axis may exist as shown in FIG. 2.

Figure 3:
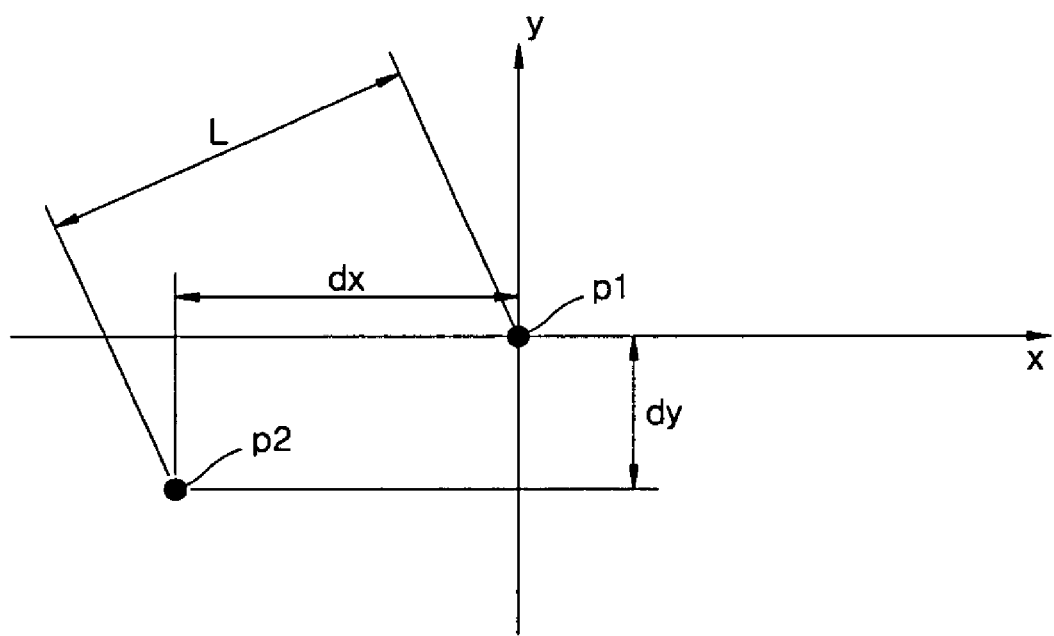
FIG. 3 shows a position difference between the first and second light sources of the light source module of FIG. 1 in an x-y coordinates plane.

Further, the position difference (dx, dy) between the first and second light sources 11 and 13 in the x-y coordinate plane exists as shown in FIG. 3. In FIG. 3, p1 denotes an emitting position of the first light source 11 and p2 denotes an emitting position of the second light source 13.

In FIG. 3, L denotes a distance between the first and second light sources 11 and 13. In a case in which the light source module 10 is a TWIN-LD having a semiconductor laser chip for a DVD and a semiconductor laser chip for a CD, the distance L indicated in FIG. 3 is about 110±10 μm.

The optical pickup according to an embodiment of the present invention is a finite optical system to shorten a focal length of the first optical element 50, which operates as a lens only for one of the first and second light beams 11a and 13a.

For this, the collimating lens 31 is configured such that the first and/or second light beams 11a and/or 13a are converted into convergent light or divergent light. In an embodiment, slightly convergent light or slightly divergent light and the first and/or second light beams 11a and/or 13a in a slightly convergent light form or a slightly divergent light form are incident on the objective lens 35.

If the collimating lens 31 is configured as described above, the optical pickup according to an embodiment of the present invention has a structure for a finite optical system so that the first and/or second light beams 11a and/or 13a in a slightly convergent light form or a slightly divergent light form are incident on the objective lens 35.

The objective lens 35 may have a transverse magnification from $-\frac{1}{5}$ to $-\frac{1}{20}$. In an embodiment, the objective lens 35 may have a transverse magnification of $-\frac{1}{10}$ to form a light spot on the recording surface of the optical disc 1 by focusing the first and/or second light beams 11a and/or 13a in the convergent light form or the divergent light form on the recording surface of the optical disc 1, and distances between an object surface and image surfaces with respect to a DVD 1a and a CD 1b are the same. Here, the object surface corresponds to a position where the first and second light sources 11 and 13 are installed. The image surface corresponds to the recording surface of the optical disc 1.

If the objective lens 35 according to an embodiment of the present invention has the transverse magnification of $-\frac{1}{10}$, when an image of an object with a predetermined height positioned on the object surface is formed on an image surface of object, a size of the image of the object may be reduced to $\frac{1}{5}$ of an original size of the object.

Meanwhile, when light emitted from a light source is incident on an objective lens after passing through a collimating lens with a short focal length, a larger quantity of light is incident on the objective lens compared to when a collimating lens with a long focal length is used so that an optical efficiency of an optical pickup may be improved.

Accordingly, the collimating lens 31 may have a shorter focal length than a collimating lens used in a general reproduction-only optical pickup to improve the efficiency of the optical pickup according to an embodiment of the present invention.

Specifically, considering that a focal length of a collimating lens used in a general compatible optical pickup to reproduce and record a CD and reproduce a DVD is 20–25 mm, the collimating lens 31 may have a shorter focal length than the focal length presented above, for example, a focal length of 15 mm or less.

Since an optical efficiency of the optical pickup according to the present invention is improved due to the collimating lens 31 with the short focal length, the optical pickup according to an embodiment of the present invention may be readily configured as a compatible optical pickup used to record not only the DVD 1*a* but also the CD 1*b*.

Figure 11:
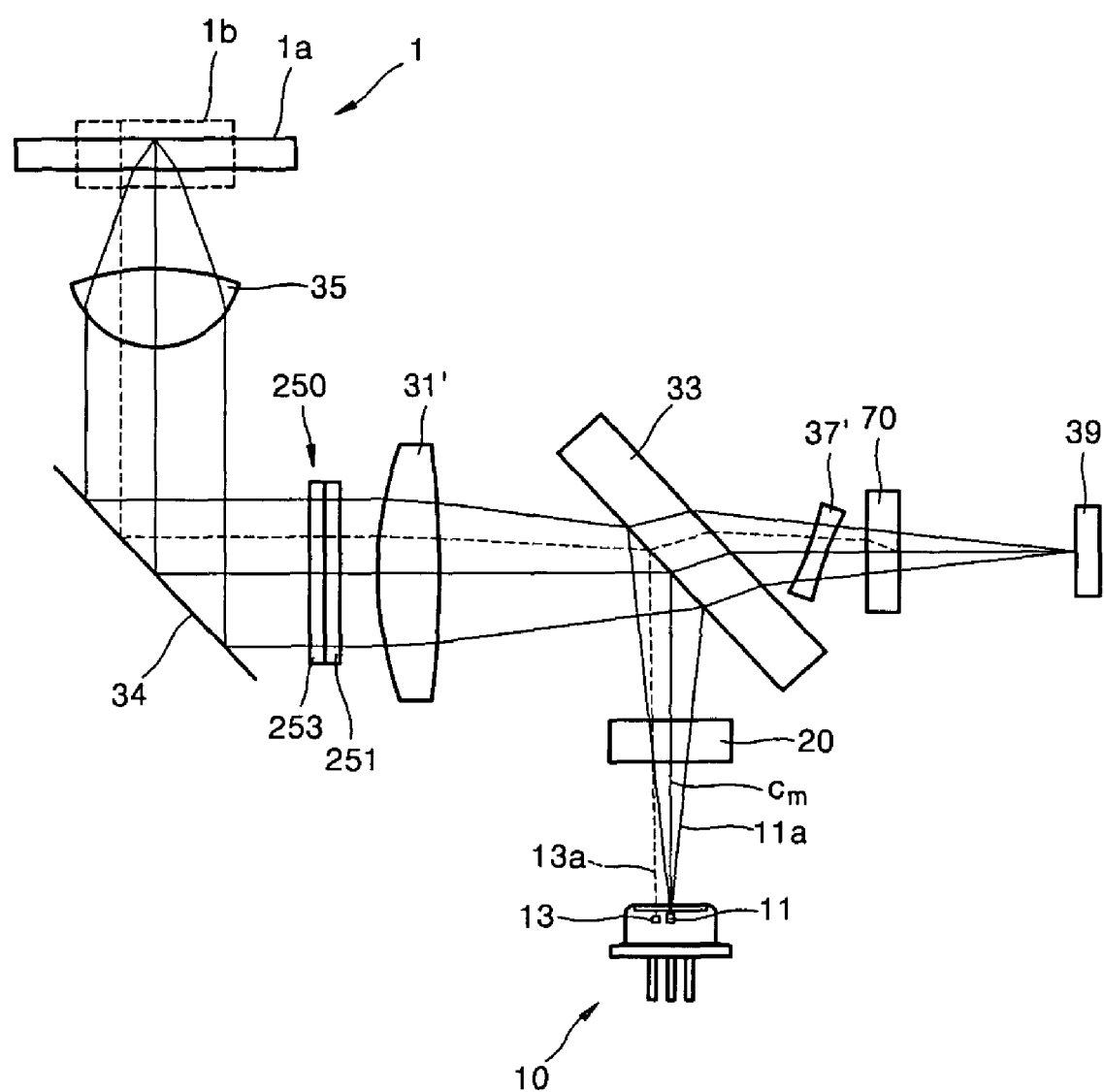
FIG. 11 schematically shows an optical structure of an optical pickup according to a fifth embodiment of the present invention.

The collimating lens 31, as shown in FIG. 1, may be disposed between the light source module 10 and the optical path changer 33, or, as shown in FIG. 11, between the optical path changer 33 and the objective lens 35.

In FIG. 1, the light source module 10 and the photodetector 39 are disposed such that the first and second light beams 11*a* and 13*a* emitted from the light source module 10 are transmitted by the optical path changer and travel toward the optical disc 1. Then, the first and second light beams 11*a* and 13*a* reflected from the optical disc 1 are reflected by the optical path changer and travel toward the photodetector 39.

The optical path changer may include a plate beam splitter 33 for transmitting and reflecting the first and second light beams 11*a* and 13*a* to a predetermined ratio. The plate beam splitter 33 may be disposed such that a reflecting angle of the first and second light beams 11*a* and 13*a* is 45° or less, for example, 30°. Other components of the optical pickup according to an embodiment of the present invention are disposed corresponding to the arrangement of the plate beam splitter 33.

Here, an incident/reflecting angle of the plate beam splitter 33 is determined considering an optical feature of the plate beam splitter 33, that is, the ratio of transmittance and reflectance, and a limitation of the disposition of optical components. Here, the limitation of the disposition of the optical components is mainly considered in a case of a slim optical pickup.

The ratio of transmittance and reflectance of the plate beam splitter 33 is in the ratio of about 90:10 or 10:90. The transmittance of two orthogonal linearly polarizations, that is, P-polarized light and S-polarized light, may be similar to each other in consideration of birefringence. As the incident angle of the plate beam splitter 33 is small, a desirable spectral feature in a coating feature of a reflecting surface of the plate beam splitter 33 is easily obtained.

Accordingly, when the plate beam splitter 33 is disposed such that the reflecting angle of the first and second light beams 11*a* and 13*a* is 45° or less, a coating design of the plate beam splitter 33 is facilitated and request of some slim optical pickups having limited disposition of the optical components may be satisfied.

Here, the plate beam splitter 33 does not need to be disposed such that the reflecting angle of the first and second light beams 11*a* and 13*a* is 45° or less. That is, the plate beam splitter 33 may be disposed such that the reflecting angle of the first and second light beams 11*a* and 13*a* is 45°.

Meanwhile, the optical path changer may include a cubic beam splitter instead of the plate beam splitter 33.

The first optical element 50 may include a hologram optical element which is disposed on a traveling path of the first and second light beams 11*a* and 13*a*. The hologram optical element has an appropriate optical power to transmit one of the first and second light beams 11*a* and 13*a* and operate as a lens for the other.

When components of the optical pickup according to the first embodiment of the present invention are configured such that the first light beam 11*a* emitted from the first light source 11 is in an optimal focus state, the first optical element 50 corrects the position difference of the second light source 13, that is, the position deviation of the second light source 13 deviated from the first light source 11 along the traveling optical axis of light, that is, the z-axis.

In a case in which the optical pickup according to an embodiment of the present invention detects a focus error signal using an astigmatic method, fitting of defocus with respect to the first light beam 11*a* means that components of the optical pickup are disposed such that the first light beam 11*a* received by the photodetector 39 has an approximate circular shape when a distance between the objective lens 35 and the recording surface of the optical disc 1 with respective to the first light beam 11*a* is set to be an on-focus state.

On the contrary, if defocus with respect to the second light beam 13*a* emitted from the second light source 13 is fitted, the first optical element 50 may correct a position deviation of the first light source 11 along the traveling optical axis of light.

When the first optical element 50 is finely adjusted along the traveling direction of light, that is, the z-axis direction, the position difference between the first and second light sources 11 and 13 along z-axis may be corrected.

Since the optical pickup according to an embodiment of the present invention is a finite optical system, a focal length of the first optical element 50 may be short.

In this case, even if the first optical element 50 is slightly moved along the z-axis direction, the position difference between the first and second light sources 11 and 13 along z-axis may be corrected. Thus, although the adjusting range of the first optical element 50 for correcting the position difference between the first and second light sources 11 and 13 along z-axis may be small, the correction is easily achieved.

In the optical pickup according to an embodiment of the present invention having the structure for the finite optical system, the focal length of the first optical element 50 may be short compared to an optical pickup having a structure for an infinite optical system. Thus, the position difference between the first and second light sources 11 and 13 along z-axis may be corrected while ensuring a space for moving the first optical element 50.

In the optical pickup according to an embodiment of the present invention having the structure for the finite optical system and the first optical element 50 with the short focal length, even if only the first optical element 50 is moved within a small range along the z-axis direction, the position difference between the first and second light sources 11 and 13 along z-axis may be corrected. Thus, the components of the optical pickup other than the first optical element 50 may be disposed without regard to the first optical element 50 because the z-axis position difference between the first and second light sources 11 and 13 may be corrected by moving only the first optical element 50 without an assistance of the components.

Although the first optical element 50 is disposed between the collimating lens 31 and the optical path changer in FIG. 1, the first optical element 50 may be disposed between the optical path changer and the photodetector 39, and in an embodiment, between the optical path changer 33 and the focusing lens 36.

The second optical element 70 is disposed on the traveling path of the first and second light beams 11*a* and 13*a*. The second optical element 70 matches a traveling axis of the first or second light beam 11*a* or 13*a* emitted from the first or second light source 11 or 13 deviated from a central axis Cm of the optical pickup with that of the other light beam 11*a* or 13*a* disposed on the central axis Cm. In FIG. 1, the second optical element 70 is disposed between the optical path changer 33 and the photodetector 39, but, the second optical element 70 is disposed between the light source module 10 and the optical path changer 33.

The second optical element 70 may include a hologram element which transmits one of the first and second light beams 11a and 13a and diffracts the other light beam in +1 order or −1 order so that the traveling axes of the first and second light beams 11a and 13a are matched with each other. The hologram element used as the second optical element 70 has no optical power and has only a position coefficient.

In FIG. 1, the first light source 11 is disposed on the central optical axis Cm and the second light source 13 is deviated from the central optical axis Cm so that the position difference between the first and second light sources 11 and 13 exists in the x-y coordinate plane. In this case, the second optical element 70, as shown in FIGS. 4 and 5, transmits the first light beam 11a having a wavelength of λ1 and diffracts the second light beam 13a having a wavelength of λ2 in +1 order or −1 order so that the second light beam 13a is refracted to travel along the same axis as the first light beam 11a.

Figure 4:
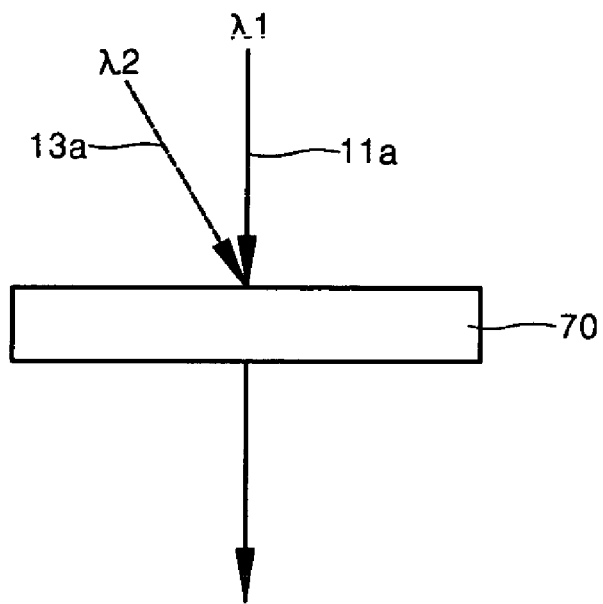
FIG. 4 shows the proceeding of first and second light beams when a second optical element of the optical pickup of FIG. 1 is disposed between an optical path changer and a photodetector.

FIG. 4 shows a traveling of the first and second light beams 11a and 13a when the second optical element 70 is disposed at a light receiving part, that is, between the optical path changer and the photodetector 39.

Figure 5:
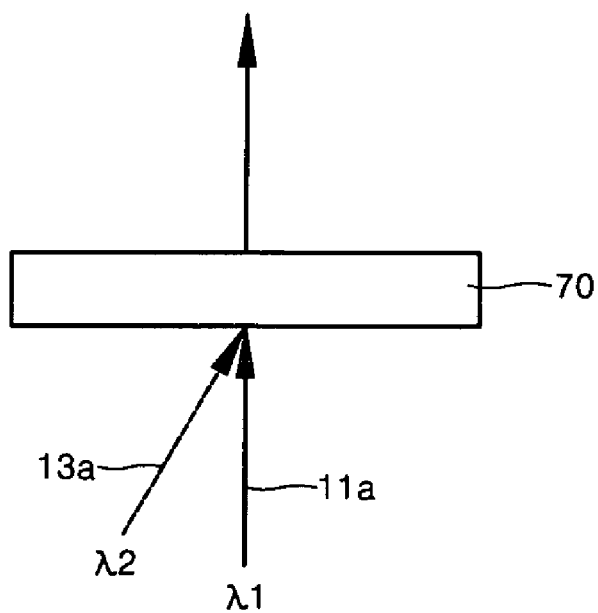
FIG. 5 shows the first and second light beams when the second optical element is disposed between the light source module and the optical path changer.

FIG. 5 shows a traveling of the first and second light beams 11a and 13a when the second optical element 70 is disposed at a light sending part, that is, between the light source module 10 and the optical path changer 33. When the second optical element 70 is disposed at the light sending part, the second optical element 70 and a grating 20 may be formed in a body, or may be used as a cover glass of the light source module 10. In a case in which the second optical element 70 is used as the cover glass of the light source module 10, the second optical element 70 must be previously adjusted along a rotation direction of the light source module 10 and the z-axis direction in a manufacturing operation of the light source module 10 to match the traveling axes of the first and second light beams 11a and 13a emitted from the first and second light sources 11 and 13 with each other.

The optical pickup according to an embodiment of the present invention further includes the grating 20 which separates at least one of the first and second light beams 11a and 13a emitted from the light source module 10 into three or more light beams to detect a tracking error signal using a three-beam method.

Figure 6:
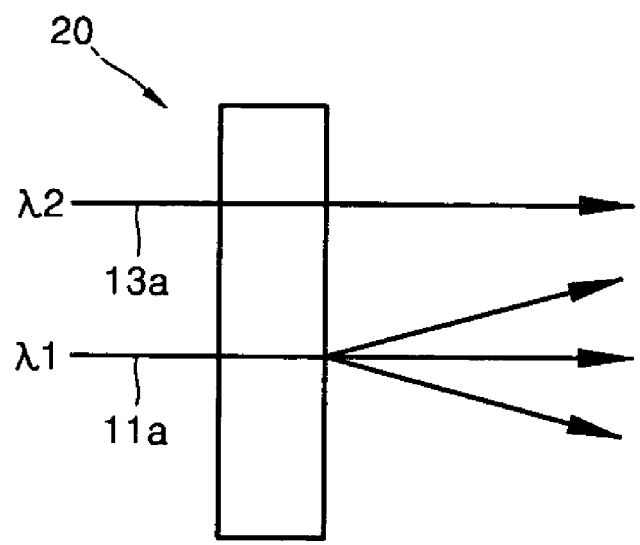
FIG. 6 shows a first example of a grating of the optical pickup of FIG. 1.

For example, in a case in which the optical pickup according to an embodiment of the present invention detects a tracking error signal of the first light beam 11a using the three-beam method, the grating 20, as shown in FIG. 6, separates the first light beam 11a into three or more light beams and transmits the second light beam 13a straight.

On the contrary, in a case in which the optical pickup according to the present invention detects a tracking error signal of the second light beams 13a using the three-beam method, the grating 20 separates the second light beam 13a into three or more light beams and transmits the first light beam 11a straight.

Here, in a case in which the second optical element 70 is disposed between the light source module 10 and the optical path changer, the second optical element 70 and the grating 20 may be formed in one body. Since the formation of the second optical element 70 and the grating 20 in one body may be sufficiently understood from the optical structure of the optical pickup according to the first embodiment of the present invention with reference to the attached drawings, a description and an illustration thereof will be omitted.

Figure 7:
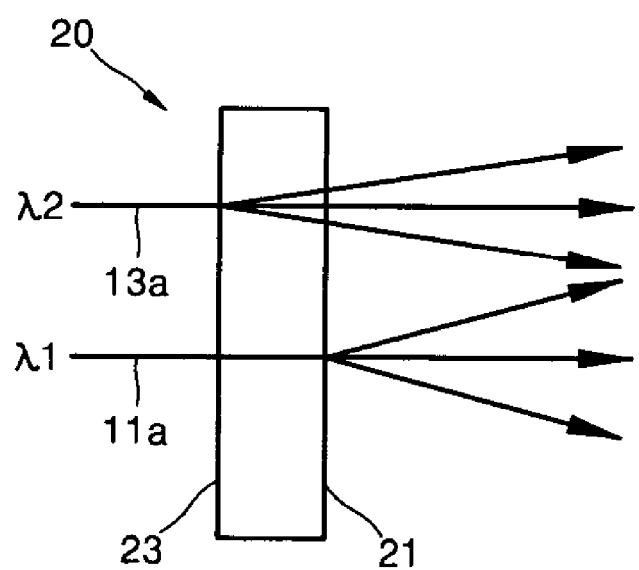
FIG. 7 shows a second example of a grating of the optical pickup of FIG. 1.

In a case in which the optical pickup according to an embodiment of the present invention detects tracking error signals of the first and second light beams 11a and 13a using the three-beam method, the grating 20, as shown in FIG. 7, includes a first grating 21 which separates the first light beam 11a into three or more light beams and transmits the second light beams 13a straight, and a second grating 23 which separates the second light beam 13a into three or more light beams and transmits the first light beam 11a straight. In FIG. 7, the first and second gratings 21 and 23 are formed in one body on both surfaces of a transparent member. However, the first and second gratings 21 and 23 may be formed separately.

Here, in a case in which the second optical element 70 is disposed between the light source module 10 and the optical path changer, the second optical element 70 and at least one of the first and second gratings 21 and 23 may be formed in one body. Since the formation of the second optical element 70 and at least one of the first and second gratings 21 and 23 in one body may be sufficiently understood from the optical structure of the optical pickup according to the first embodiment of the present invention with reference to the attached drawings, a description and an illustration thereof will be omitted.

The optical pickup according to the first embodiment of the present invention may further include an adjusting lens 37 for fitting defocus with respect to one of the first and second light beams 11a and 13a.

The adjusting lens 37 may be used as a detecting lens for suitably making a size of a light spot received in the photodetector 39.

The adjusting lens 37 may be formed as an astigmatic lens to detect a focus error signal using an astigmatic method.

In other words, the adjusting lens 37 may be formed to operate as both the detecting lens and the astigmatic lens.

For example, if the second sight source 13 is a correction object in which the positive deviation must be corrected by the first optical element 50, the adjusting lens 37 is used for fitting defocus of the first light beam 11a. That is, if the optical pickup according to an embodiment of the present invention is a compatible optical pickup that may be used in both DVD and a CD, the adjusting lens 37 is used for adjusting defocus with respect to the DVD and the first optical element 50 is used for adjusting defocus with respective to the CD.

As shown in FIG. 1, in a case in which the collimating lens 31 is disposed between the light source module 10 and the optical path changer, it is preferable that the optical pickup according to an embodiment of the present invention may further include a condensing lens 36 which condenses the first and second light beams 11a and 13a in the slightly convergent and/or slightly divergent light form. In FIG. 1, reference numeral 34 denotes a reflecting mirror.

The position difference between the first and second light sources 11 and 13 generated in the optical pickup according to the first embodiment of the present invention may be corrected as follows.

First, when the traveling direction of light is the z-axis direction, the optical components of the optical pickup according to the first embodiment of the present invention are disposed such that defocus with respect to the first light beam 11a emitted from the first light source 11 is fitted. Thus, the first optical element 50 is provided to operate as a lens only for the second light beam 13a.

Next, the first optical element 50 for operating as a lens only for the second light beam 13a is adjusted along the z-axis so that defocus with respect to the second light beam 13a is fitted, thus correcting the position difference between the first and second light sources 11 and 13 along the z-axis.

Here, in a case in which the first optical element 50 is provided to operate as a lens only for the first light beam 11a, the optical pickup according to the first embodiment of the present invention is disposed such that defocus with respect to the second light beam 13a emitted from the second light source 13 is fitted. Then, defocus with respect to the first light beam 11a is fitted using the first optical element 50.

In a case in which the optical pickup according to the first embodiment of the present invention includes the second optical element 70 for correcting the position deviation of a light source for emitting light deviated from the central optical axis Cm of the optical pickup, the position difference (dx, dy) between the first and second light sources 11 and 13 in the x-y coordinate plane may be corrected as follows.

First, the position of the photodetector 39 is adjusted such that one of the first and second light beam 11a and 13a emitted from the first and second light source 11 and 13 and then reflected from the optical disc 1, that is, a light spot of the light beam 11a or 13a traveling along the central axis Cm, is received in the center of the photodetector 39.

Next, the second optical element 70 is adjusted along the rotation direction and/or the z-axis direction so that a light spot of the other light beam 11a or 13a deviated from the central axis Cm is received in the central portion of the photodetector 39. Thus, the position difference between the first and second light sources 11 and 13 is corrected so that the optical axes of the first and second light beams 11a and 13a are matched with each other. At this time, the second optical element 70 transmits the light beam traveling along the central axis Cm and diffracts the other light beam deviated from the central axis Cm two or more times.

Hereinafter, optical pickups according to other embodiments of the present invention will be described. The method to correct the position difference used in the optical pickup according to the first embodiment of the present invention may be applied to the optical pickups according to other embodiments of the present invention.

Figure 8:
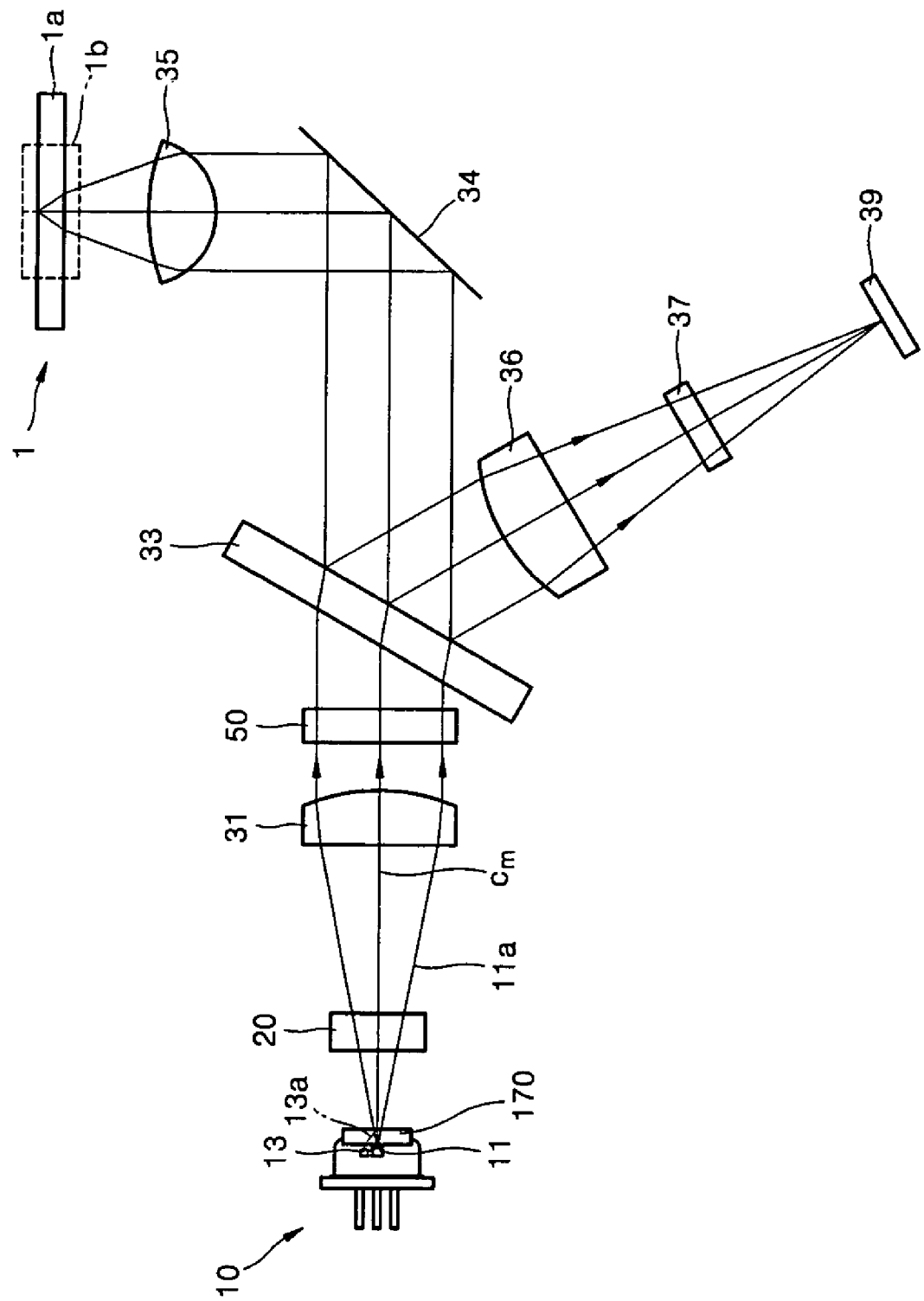
FIG. 8 schematically shows an optical structure of an optical pickup according to a second embodiment of the present invention.

FIG. 8 shows an optical structure of an optical pickup according to a second embodiment of the present invention. The optical pickup of FIG. 8 includes a second optical element 170 to match a traveling optical axis of a first light beam 11a with that of a second light beam 13a, is disposed between a light source module 10 and an optical path changer and is used as a cover glass of the light source module 10. In FIG. 8, the same reference numerals as those in FIG. 1 represent the same elements, and thus their descriptions will be omitted.

As shown in FIG. 8, in a case in which the second optical element 170 is used as the cover glass of the light source module 10, the second optical element 170 is previously adjusted in θ-axis and z-axis directions in a manufacturing step of the light source module 10 so that traveling optical exes of the first and second light beams 11a and 13a are matched with each other.

Figure 9:
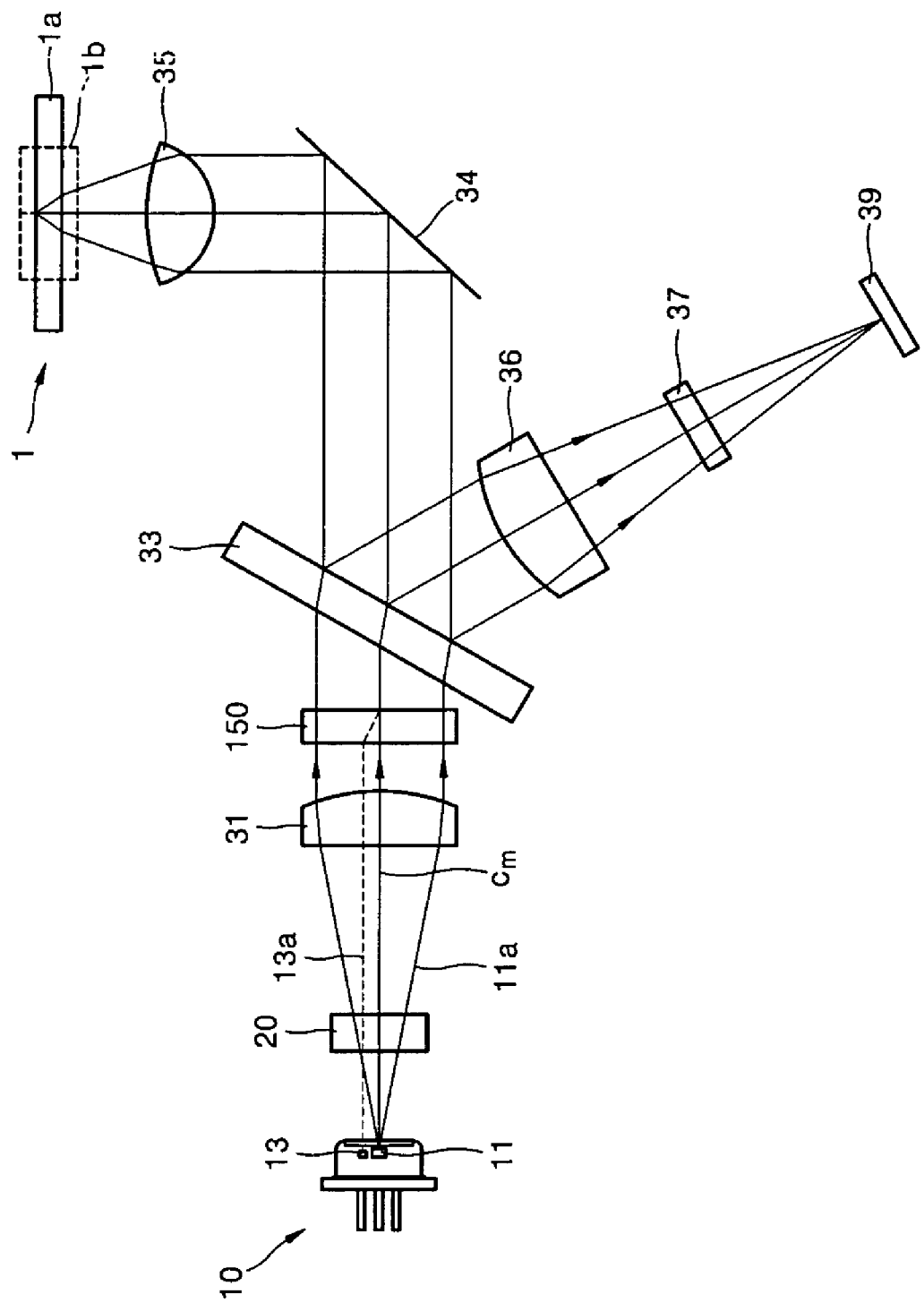
FIG. 9 schematically shows an optical structure of an optical pickup according to a third embodiment of the present invention.

FIG. 9 shows an optical structure of an optical pickup according to a third embodiment of the present invention. The optical pickup of FIG. 9 may include only one optical element 150. In FIG. 9, the same reference numerals as those in FIG. 1 represent the same elements, and thus their descriptions will be omitted.

The optical element 150 corrects a position difference between first and second light sources 11 and 13 along a traveling optical axis of light.

Further, the optical element 150 matches the traveling optical axis of the first light beam 11a with that of the second light beam 13a. As shown in FIG. 9, the optical element 150 may be disposed between a collimating lens 31 and an optical path changer. The optical element 150 may be disposed between the optical path changer and a focusing (condensing) lens 36.

Since the structure and operation of the optical element 150 used in the optical pickup according to the third embodiment of the present invention may be sufficiently understood from the first and/or second optical elements of the above embodiments, a description thereof will be omitted.

Figure 10:
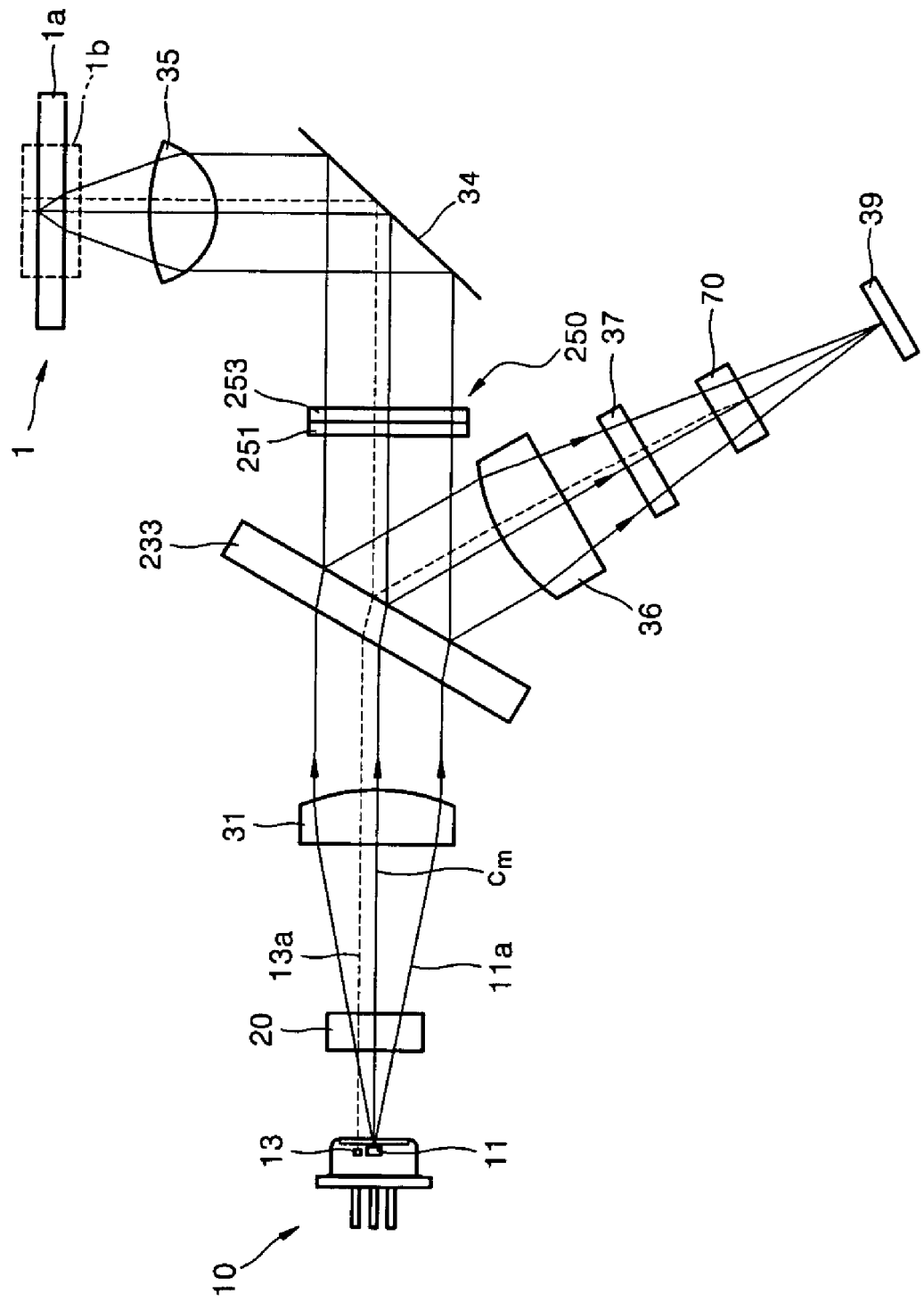
FIG. 10 schematically shows an optical structure of an optical pickup according to a fourth embodiment of the present invention.

FIG. 10 shows an optical structure of an optical pickup according to a fourth embodiment of the present invention. A first optical element 250 is disposed between an optical path changer 233 and an objective lens 35. In FIG. 10, the same reference numerals as those in FIG. 1 represent the same elements, and thus their descriptions will be omitted.

As shown in FIG. 10, when the first optical element 250 is disposed on an optical path between the optical path changer and the objective lens 35, the first optical element 250 may be a transmitting type polarization hologram optical element which operates with respect to a light beam to be a correction object for a position difference of first and second light beams 11a and 13a, and transmits another light beam.

In FIG. 10, in a case in which the second light beam 13a may be the correction object for the position difference, the first optical element 250 operates to correct the position difference of the second light beam 13a.

The first optical element 250 includes a polarization hologram 251, which transmits the first light beam 11a and operates as a lens only for one-polarization component of the second light beam 13a, and a wave plate 253 which changes polarization of incident light, preferably, a quarter-wave plate 253 for changing the polarization of the second light beam 13a.

A semiconductor laser chip may be used as first and second light sources 11 and 13. Considering that the semiconductor laser chip emits a laser beam in which one of P-polarized light and S-polarized light is superior to the other, the first optical element 250 operates as a lens for the second light beam 13a, which is emitted from a light source module 10 or reflected from an optical disc 1 and then travels in one direction.

For example, assuming that the light source module 10 emits the S-polarized second light beam 13a, the polarization hologram 251 of the first optical element 250 operates as a lens only for the S-polarized second light beam 13a.

In this case, the first optical element 250 transmits the first light beam 11a incident from the light source module 10. The first light beam 11a is reflected from the optical disc 1 and then is transmitted by the first optical element 250. On the other hand, the S-polarized second light beam 13a incident from the light source module 10 is condensed or diverged by the polarization hologram 251 of the first optical element 250 and the second light beam 13a passed through the wave plate 253 is changed into one-circularly polarized light. One circularly polarized second light beam 13a may be reflected from the optical disc 1 and converted into circularly polarized light perpendicular thereto. The other circularly polarized second light beams 13a may pass through the wave plate 253, become P-polarized light, and be transmitted by the polarization hologram 251 of the first optical element 250.

Although the polarization of the first light beam 11a is changed due to the wave plate 253, since the polarization hologram 251 operates as a lens only with respect to the light S-polarized and having the same wavelength as that of the second light beam 13a, a change in the polarization of the first light beam 11a due to the wave plate 253 may be disregarded.

Here, in a case in which the first light beam 11a must be corrected, the first optical element 250 operates as a lens only for the first light beam 11a.

In a case in which the first optical element 250 is a transmitting type polarization hologram optical element, a plate beam splitter 233 or a cubic polarization beam splitter may be used as the optical path changer. The plate beam splitter 233 has a mirror surface such that a light beam that must be corrected by the first optical element 250 is selectively transmitted or reflected according to polarization state and a light beam that does not need to be corrected by the first optical element 250 is transmitted or reflected according to a predetermined ratio.

As shown in FIG. 11, an optical pickup according to a fifth embodiment of the present invention may configured such that first and second light beams 11a and 13a emitted from a light source module 10 are reflected by an optical path changer and travel toward an optical disc 1. In a case in which a plate beam splitter 33 is used as the optical path changer, an adjusting lens 37' may be inclined opposite to a direction of inclination of the plate beam splitter 33 to correct coma aberration generated in the first and second light beams 11a and 13a reflected from the optical disc 1 and then transmitted by the plate beam splitter 33.

In FIG. 11, a collimating lens 31' is disposed between the plate beam splitter 33 and an objective lens 35 to convert the first and second divergent light beams 11a and 13a emitted from the light source module 10 into slightly convergent light or slightly divergent light. In a case in which the collimating lens 31' is disposed between the plate beam splitter 33 and the objective lens 35, a condensing lens used in the above embodiments may be omitted.

Here, the configuration of the optical pickup according to the fifth embodiment of the present invention in which the first and second light beams 11a and 13a emitted from the light source module 10 are reflected by the optical path changer 33 and travel to the optical disc 1 is not limited to the configuration shown in FIG. 11. The configuration of the optical pickup may be modified variously based on the above various embodiments.

The optical structure of the optical pickup using the two-wavelength light source module may be modified variously within the spirit and scope of the present invention as defined by the appended claims.

As described above, an optical pickup with a structure for a finite optical system includes a first optical element which operates as a lens only for one of two light beams of different wavelengths emitted from a light source module.

Further, the first optical element may match traveling optical axes of the two light beams with each other. The optical pickup separately includes a second optical element which matches the traveling optical axes of the two light beams with each other.

The optical pickup may correct a position difference between two light sources of the light source module along the traveling optical axis of light, and also the traveling optical axes of the two light beams emitted from the two light sources may be matched with each other.

The optical pickup may be used for multi-recording. That is, the optical pickup may be used for recording and/or reproducing information on and/or from optical discs of different formats using light beams of different wavelengths, for example, DVD family optical discs and CD family optical discs.

Since the optical pickup has the structure for the finite optical system, a focal length of the first optical element may be relatively short, and a sufficient adjusting space for correcting the position difference between the two light sources along the traveling optical axis of light may be ensured.

Further, since the optical pickup has the structure for the finite optical system, a size of apparatuses using the optical pickup may be reduced.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An optical pickup comprising:
 a light source module in which first and second light sources which emit first and second light beams of different wavelengths are formed in a single package;
 an objective lens which focuses the first and second light beams and forms a light spot on a recording surface of a recording medium;
 a collimating lens which directs the first and/or second light beams into convergent light or divergent light so that the convergent light or the divergent light is incident on the objective lens, the optical pickup being a finite optical system;
 an optical path changer which converts traveling paths of the first and second light beams;
 a photodetector which receives the first and second light beams reflected from the recording medium and then passed through the objective lens and the optical path changer, and detects an information signal and/or an error signal;
 a first optical element which is disposed on the traveling paths of the first and second light beams, operates as a lens only for one of the first and second light beams, and corrects a position difference between the first and second light sources along a traveling direction of light; and
 a second optical element which is disposed on the traveling paths of the first and second light beams and matches traveling optical axes of the first and second light beams with each other.

2. The optical pickup of claim 1, wherein the collimating lens directs the first and/or second light beams incident from the light source module into slightly divergent light or slightly convergent light.

3. The optical pickup of claim 1, wherein the collimating lens has a short focal length of 15 mm or less.

4. The optical pickup of claim 1, wherein the second optical element is disposed between one of:
 the light source module and the optical path changer; and
 the optical path changer and the photodetector.

5. The optical pickup of claim 1, wherein the second optical element is used as a cover glass for the light source module.

6. The optical pickup of claim 1, wherein the first optical element is disposed between one of:
the collimating lens and the optical path changer; and
the optical path changer and the photodetector.

7. The optical pickup of claim 1, wherein the first optical element is disposed between the optical path changer and the objective lens, and is a transmitting type polarization hologram type.

8. The optical pickup of claim 1, further comprising a first grating which separates one of the first and second light beams into three or more light beams due to diffraction and transmits the other light beam straight.

9. The optical pickup of claim 8, further comprising a second grating which separates the light beam transmitted straight by the first grating into three or more light beams due to diffraction and transmits straight the light beam diffracted and separated by the first grating.

10. The optical pickup of claim 9, wherein the first and second gratings are formed in one body.

11. The optical pickup of claim 1, wherein the objective lens has a transverse magnification from −1/5 to −1/20.

12. The optical pickup of claim 1, further comprising an adjusting lens to fit a defocus of one of the first and second light beams that traveled toward the photodetector.

13. The optical pickup of claim 12, wherein the adjusting lens operates as both detecting lens and an astigmatic lens.

14. The optical pickup of claim 1, wherein one of the first and second light beams has a red wavelength range, the other light beam has a near infrared ray wavelength range, and the optical pickup is used for recording and/or reproducing information on and/or from digital versatile disc (DVD) family of optical discs and compact disc (CD) family of optical discs.

15. An optical pickup comprising:
a dual wavelength light source module, to generate a first light beam having a first wavelength and a second light beam having a second wavelength;
a light path converter, to convert one of the first light beam and the second light beam into convergent/divergent light, operate as a lens only for one of the first and second light beams, redirect the first and second light beams to an objective lens and, upon reflection of the first and second light beams from an optical disk recording medium and passing back through the objective lens, reflect the first and second light beams;
the objective lens, to focus the first and the second light beams on the optical disk recording medium that reflects the first and second light beams back through the objective lens to the light path converter;
a photodetector which receives the first and second light beams that are reflected from the optical disk recording medium, passed through the objective lens and the light path converter and detects an information signal and/or an error signal;
a collimating lens which directs the first and/or second light beams into convergent light or divergent light so that the convergent light or the divergent light is incident on the objective lens;
a first optical element which is disposed on the traveling paths of the first and second light beams, operates as a lens only for one of the first and second light beams, and corrects a position difference between the first and second light sources along a traveling direction of light, wherein the first optical element is disposed between one of:
the collimating lens and the optical path changer; and
the optical path changer and the photodetector; and an optical path changer which converts traveling paths of the first and second light beams; and
a second optical element which is disposed on the traveling paths of the first and second light beams and matches traveling optical axes of the first and second light beams with each other.

16. The optical pickup of claim 15, wherein the collimating lens directs the first and/or second light beams incident from the light source module into slightly divergent light or slightly convergent light.

17. The optical pickup of claim 15, wherein the collimating lens has a short focal length of 15 mm or less.

18. The optical pickup of claim 15, wherein the second optical element is disposed between one of:
the light source module and the optical path changer; and
the optical path changer and the photodetector.

19. The optical pickup of claim 15, wherein the second optical element is used as a cover glass for the light source module.

20. The optical pickup of claim 15, wherein the first optical element matches the traveling optical axes of the first and second light beams with each other.

21. The optical pickup of claim 15, wherein the first optical element is disposed between the optical path changer and the objective lens, and is a transmitting type polarization hologram type.

22. The optical pickup of claim 15, further comprising a first grating which separates one of the first and second light beams into three or more light beams due to diffraction and transmits the other light beam straight.

23. The optical pickup of claim 21, further comprising a second grating which separates the light beam transmitted straight by the first grating into three or more light beams due to diffraction and transmits straight the light beam diffracted and separated by the first grating.

24. The optical pickup of claim 23, wherein the first and second gratings are formed in one body.

25. The optical pickup of claim 15, wherein the objective lens has a transverse magnification from −1/5 to −1/20.

26. The optical pickup of claim 15, further comprising an adjusting lens to fit a defocus of one of the first and second light beams that traveled toward the photodetector.

27. The optical pickup of claim 26, wherein the adjusting lens operates as both detecting lens and an astigmatic lens.

28. The optical pickup of claim 15, wherein one of the first and second light beams has a red wavelength range, the other light beam has a near infrared ray wavelength range, and the optical pickup is used for recording and/or reproducing information on and/or from digital versatile disc (DVD) family of optical discs and compact disc (CD) family of optical discs.

29. The optical pickup of claim 1, wherein the collimating lens is disposed between one of:
the light source module and the optical path changer; and
the optical path changer and the objective lens.

30. The optical pickup of claim 15, wherein the collimating lens is disposed between one of:
the dual wavelength light source module and the light path converter; and
the light path changer and the objective lens.

31. The optical pickup of claim 1, wherein the first optical element includes a hologram optical element that is disposed on a travelling path of the first and the second light beams and transmits one of the first and the second light beams and operates as a lens for the other.

32. The optical pickup of claim 15, wherein the first optical element includes a hologram optical element that is disposed on a travelling path of the first and the second light beams and transmits one of the first and the second light beams and operates as a lens for the other.

33. The optical pickup of claim 12, wherein the optical path changer is a plate beam splitter, and the adjusting lens is inclined opposite to a direction of inclination of the plate beam splitter to correct coma aberration generated in the first and second light beams reflected from the optical disc and then reflected by the plate beam splitter.

34. The optical pickup of claim 26, wherein the optical path changer is a plate beam splitter, and the adjusting lens is inclined opposite to a direction of inclination of the plate beam splitter to correct coma aberration generated in the first and second light beams reflected from the optical disc and then reflected by the plate beam splitter.

* * * * *

UNITED STATES PATENT AND TRADEMARK OFFICE
CERTIFICATE OF CORRECTION

PATENT NO. : 7,218,598 B2
APPLICATION NO. : 10/655608
DATED : May 15, 2007
INVENTOR(S) : Kun-soo Kim et al.

It is certified that error appears in the above-identified patent and that said Letters Patent is hereby corrected as shown below:

Column 14, Line 31, change "claim 21," to --claim 22,--.

Column 14, Line 65, change "travelling" to --traveling--.

Column 15, Line 3, change "travelling" to --traveling--.

Signed and Sealed this

Twentieth Day of November, 2007

JON W. DUDAS
*Director of the United States Patent and Trademark Office*